United States Patent [19]
Bristow

[11] 4,095,968
[45] Jun. 20, 1978

[54] METHOD OF BENDING GLASS SHEETS WITHOUT HEATING

[75] Inventor: Charles R. Bristow, Arcadia, Calif.

[73] Assignee: Le Van Specialty Co. Inc., City of Industry, Calif.

[21] Appl. No.: 844,725

[22] Filed: Oct. 25, 1977

[51] Int. Cl.[2] .............................................. C03B 23/02

[52] U.S. Cl. ........................................ 65/104; 65/106; 65/114; 29/445

[58] Field of Search ................. 65/104, 114, 349, 102, 65/106; 29/445

[56] References Cited

U.S. PATENT DOCUMENTS

| | | | |
|---|---|---|---|
| 2,949,667 | 8/1960 | Cameron et al. | 29/445 X |
| 3,822,122 | 7/1974 | Plumat et al. | 65/104 X |

FOREIGN PATENT DOCUMENTS

| | | | |
|---|---|---|---|
| 1,059,296 | 11/1953 | France | 65/106 |

*Primary Examiner*—Arthur D. Kellogg
*Attorney, Agent, or Firm*—Francis X. LoJacono

[57] ABSTRACT

A method of bending various sizes and shapes of flat glass sheets or plates, wherein there is created a curved glass window assembly providing a radius of curvature along a single longitudinal plane. The method includes providing a sheet of substantially flat glass of any specified thickness and mounting the glass in a frame structure disposed along the peripheral edge of the glass, the frame structure being formed from a rigid, bendable frame member and a pliable plastic or like molding positioned between the frame member, and then applying force to the rigid frame so as to cause the frame to adapt to a curvature relative to the applied force, whereby the glass therein will assume the radius curvature formed in the attached rigid frame structure. By this method, straight or flat glass may be curved, and curved glass may be given a different radius of curvature from the free state.

10 Claims, 7 Drawing Figures

METHOD OF BENDING GLASS SHEETS WITHOUT HEATING

BACKGROUND OF THE INVENTION

1. Field of the Invention

This invention relates generally to forming a desired shape for a sheet of glass, and more particularly to the forming of a radius curvature to a sheet of glass disposed within a rigid, bendable frame structure without heating the glass prior to bending.

2. Description of the Prior Art

As is well known in the art, various problems and difficulties are encountered in providing a suitable method of bending sheets of glass, particularly large sheets of flat glass.

Several methods of bending glass sheets or plates are well known; however, these methods require the glass sheets to be treated and formed in a bending furnace, or at least during a period when the glass sheet or plate is heated to the softening point of the glass, so that it sags by gravity into contact with the shaping surface of a mold, wherein the glass assumes the shape or curvature thereof. Thus, the glass sheet can then be annealed or it can be tempered by subjecting the opposite surface of the heated sheet to jets or blasts of a cooling medium, such as air.

One known method for bending glass is disclosed in U.S. Pat. No. 3,396,000.

SUMMARY OF THE INVENTION

This invention comprises a new and unique method of forming a curved glass window assembly without the use of heat-treating the glass or plate. With the following disclosed bending method, a single flat sheet of glass can be provided with a curved radial surface by mounting a substantially rigid, bendable frame structure to the peripheral edge of the glass sheet or plate, and then applying a force to the frame structure at a predetermined point so as to cause the frame to bend in a single longitudinal plane of the assembly.

By means of this invention, any shape of glass can be curved — that is, any peripheral shape such as a circular, square, rectangular, trapazpoidal, elipsoidal, triangular, and any imaginable polygon.

Prior to applying the bending forces, the individual components are assembled while they are in a flat state; and thereafter the total assembly is given a curvature in one plane of the assembly.

OBJECTS AND ADVANTAGES OF THE INVENTION

The present invention has for an important object to provide an improved method of bending glass sheets and plates without the need for preheating the glass prior to forming the glass.

Another object of the invention is to provide a method of bending glass sheets or plates without the use of conventional bending molds.

It is another object of the present invention to provide a method of the above character wherein a rigid, bendable frame structure is mounted about the peripheral edge of a flat sheet of glass prior to forming an arcuate curved configuration along one plane thereof.

It is still another object of the invention to provide a method of bending glass sheets without heating the glass, wherein the frame structure is bent to the required curved configuration by applying force to the rigid frame, but specifically not to the glass constrained therein.

It is a further object of the invention to provide a method of this character wherein the curvature of the glass is achieved by forcing the glass to bend along with the frame and to follow the curvature thereof.

It is still a further object of the invention to provide a method of bending sheets of glass wherein straight glass may be curved, and curved glass may be given a different radius of curvature.

Still another object of the invention is to provide a method of this type that is relatively inexpensive and simple to perform.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

DESCRIPTION OF THE DRAWINGS

Referring more particularly to the accompanying drawings, which are for illustrative purposes only.

DESCRIPTION OF THE PREFERRED EMBODIMENT

Figure 1:
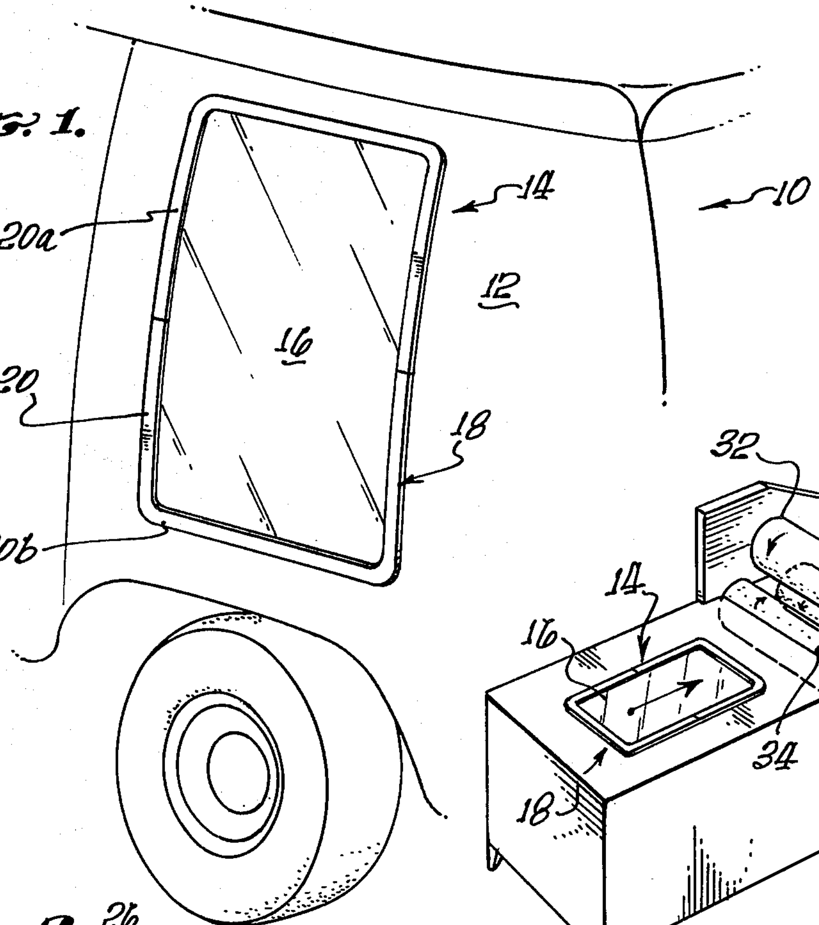
FIG. 1 is a partial, pictorial view of a vehicle having a bent glass and frame structure mounted in the conventional side wall of the vehicle.
Figure 4:
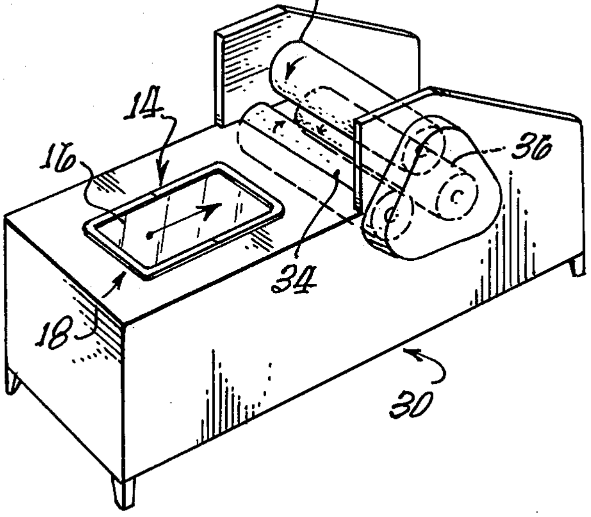
FIG. 4 is a perspective view of a pressing-and-forming machine.
Figure 2:
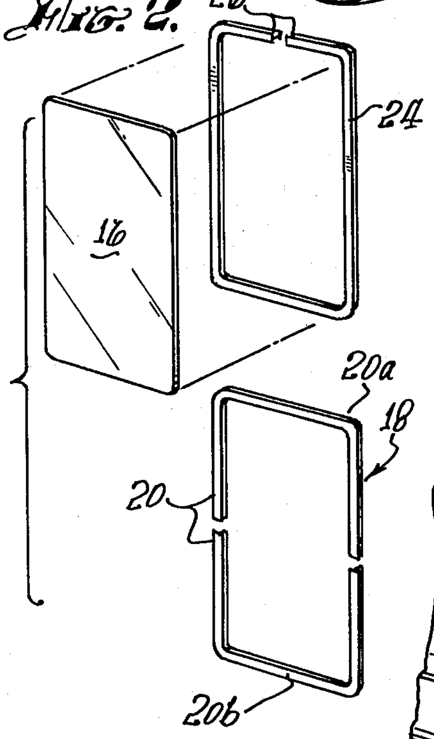
FIG. 2 is an exploded perspective view of the glass sheet and the elements of the frame structure.

Referring more particularly to FIG. 1, there is shown a vehicle, generally indicated at 10, having a curved side wall 12 wherein there is mounted a bent-glass-and-frame assembly, indicated generally at 14. The glass-and-frame assembly is bent to conform to the curvature of the side wall 12.

The illustration shown in FIG. 1 is shown as an example of one use of a bent-glass-and-frame assembly. It should be understood that other structures, as well as vehicles, employ the use of bent glass together with a frame assembly. It is, therefore, contemplated that various degrees of arcuate radii will be applied to the frame assembly 14 to match the configuration of an associated structure, such that might be found in a building or like structure.

The frame assembly comprises a glass sheet or plate 16 of any required peripheral configuration. That is, the peripheral shape can include circular, square, rectangular, trapazoidal, elipsoidal, triangular, and any imaginable polygon. Mounted to the glass sheet 16 is a substantially rigid frame structure 18; and, in this illustration, frame structure 18 and glass 16 are shown having a generally rectangular overall configuration, wherein the frame structure comprises a rigid molding 20 made preferably from an extruded aluminum material and divided into two equal sections 20*a* and 20*b*.

Figure 3:
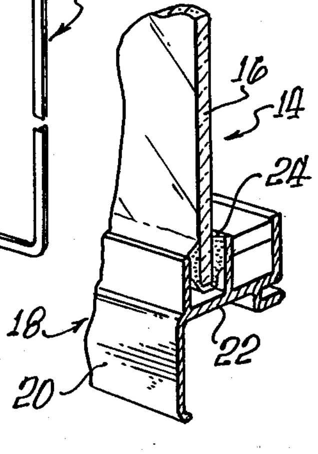
FIG. 3 is a perspective, cross-sectional view of a portion of the frame structure having the glass mounted therein.

The extruded aluminum mold 20 is clearly shown in FIG. 3 and has glass 16 secured in channel 22 by a conventional, resilient, retainer means defined by a gasket 24, generally consisting of a plastic vinyl material, also formed by an extrusion, wherein the gasket is secured to the peripheral edge of glass or plate 16. Thus, the peripheral edge of glass 16 is encapsulated in the resilient material. The resilient gasket can be extruded in any shape as required by the shape of the glass 16, and is disposed thereon in a continuous manner around the glass edge and affixed thereto by bonding its joint ends 26. However, other methods of applying various resilient gasket materials are also contemplated, since various synthetic materials can be used, such as synthetic rubber, plastic or a natural rubber.

Accordingly, once the step of positioning the gasket 24 about the edge of glass 16 is performed, the step of positioning the rigid frame molding 20 takes place. That is, the rigid molding is contoured to be readily received over the gasket and edge of glass 16, and is held by a force-fit, or other well-known securing methods or means. The molding, as mentioned, is generally formed by the extrusion of a metal, such as aluminum. Thus, the frame structure must be rigid, yet bendable, to establish a defined curvature. Further, the molding can be extruded shape, or a rolled shape; or a combination of shapes affixed together can be made in one piece, or two or more sections such as sections 20*a* and 20*b*.

With the two sections 20*a* and 20*b*, each section is positioned over opposite ends of the glass 16. Thus, depending upon the arrangement of the molding, various fastening means can be employed. Thus, moldings made of multiple pieces are joined by welding, brazing, or soldering — or by threaded fasteners, rivets, or any commonly used fastener means.

It should be further noted that the assembly can incorporate any kind of glass to arcuately bend — including, but not limited to, raw glass of any common thickness, laminated glass, including single/single, single/double and double/double thicknesses. The various glass sheets can also be bent by this method after the glass has been annealed or tempered.

Once the frame structure is assembled wherein glass 16, gasket 24, and molding 20 are in a substantially flat plane, the total assembly is given a predetermined arcuate curve in one plane by applying forces in the desired plane. These forces are applied by suitable means, such as fixtures, machine tools, jigs and dies. However, the most satisfactory method of applying force to the assembly frame is by an adjustable press means, designated at 30, comprising a plurality of rollers 32, 34 and 36. Roller 32 is vertically adjustable, while roller 34 is positioned forwardly and below roller 32; roller 36 is positioned rearwardly and below roller 32, wherein rollers 34 and 36 are juxtapositioned in identical parallel planes to each other; and roller 32 is positioned above and equally between lower rollers 34 and 36.

A predetermined curvature of the glass-and-frame assembly 14 is established by the position of roller 32 to the adjacent rollers 34 and 36. That is, the closer roller 32 is lowered vertically with respect to rollers 34 and 36 the more arcuate the radius becomes as the force is applied specifically to the frame and not to the glass.

Figure 5:
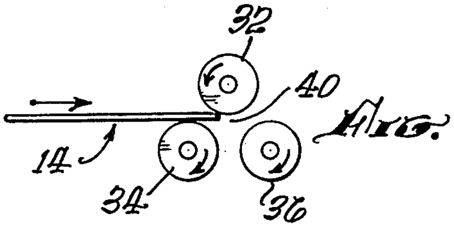
FIGS. 5, 6 and 7 are schematic views showing one arrangement of applying force to the frame structure.
Figure 6:
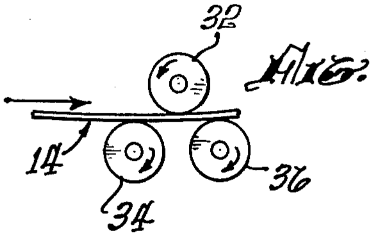
Figure 7:
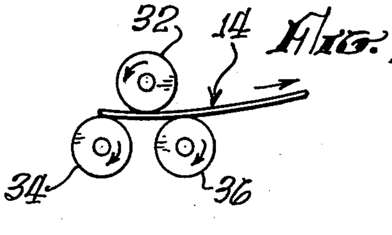

Thus, the bending of the assembly is created by passing the total glass-and-frame assembly between upper roller 32 and the lower rollers 34 and 36, as seen in FIGS. 5, 6 and 7. In some cases, the lower rollers can also be adjustable relative to upper roller 32, wherein space 40 determines the amount of applied force or pressure to the frame, and whereby the frame assumes an arcuate configuration along the horizontal plane being longitudinally fed into the rollers. Hence, as the frame bends, the curvature of the glass is achieved by forcing it to follow the bending curvature of the rigid frame.

Accordingly, as long as the frame retains its arcuate configuration, the glass will be held in bent relationship thereto.

SUMMARY

When the glass-and-window assembly 14 is in a flat, assembled state, a radius of curvature is induced in the principal direction along the major axis of the window by means of a force-applying mechanical process, wherein the process induces a radius of curvature by running the assembly through a set of bending rollers, or by applying a force to a set of bending dies in a bending brake.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A method of bending a glass sheet having a substantially rigid frame structure mounted thereon, wherein the steps of the method comprise:
   - providing a substantially flat sheet of glass of a predetermined thickness;
   - mounting a rigid bendable frame structure to said flat sheet of glass; and
   - applying force to the frame structure to cause said frame structure to bend in a single plane in an arcuate manner, whereby a radius curvature is formed in said glass-and-frame structure.

2. A method as recited in claim 1, wherein the glass is bent with said frame structure when said glass is at ambient temperature, and not heated, at the time of bending.

3. A method as recited in claim 2, wherein additional steps include:
   - providing a predetermined peripheral configuration of said sheet of glass; and
   - forming said frame structure to correspond to said peripheral configuration of said sheet of glass.

4. A method as recited in claim 3, wherein the sheet of glass is tempered prior to being bent.

5. A method as recited in claim 3, wherein said frame structure includes:
   - a resilient gasket means; and
   - a rigid, bendable molding frame.

6. A method as recited in claim 5, wherein additional steps include:
   - affixing said resilient gasket means about the peripheral edge of said glass sheet; and
   - mounting said rigid, bendable molding frame over said resilient gasket so as to restrain said glass in said frame structure, whereby said glass is bent along with said frame structure and held in the same arcuate, curved configuration as said frame structure.

7. A method as recited in claim 1, wherein force is applied along the longitudinal axis of said glass and said rigid frame structure, and wherein means are provided for applying said force along said longitudinal axis in a continuous manner throughout the length of said frame structure.

8. A method as recited in claim 7, wherein said force-applying means comprises:

a roller-bending means having a pair of lower rollers, arranged in a parallel juxtaposed relationship to each other, and a single upper roller positioned above and between each lower roller, said upper roller being adjustably spaced with respect to said lower rollers, whereby the space therebetween determines the degree of bend imparted in said frame structure.

9. A method as recited in claim 7, wherein an additional step includes passing said substantially flat sheet of glass and said frame structure through said rollers, causing said frame and glass to bend in an arcuate manner.

10. A method as recited in claim 5, wherein said rigid, bendable molding frame comprises at least two sections, wherein additional steps include:

mounting each section of said molding frame over opposite ends of said glass; and securing said sections together with a securing means whereby said sections form said frame structure.

* * * * *